(12) United States Patent
Jin et al.

(10) Patent No.: US 10,565,142 B2
(45) Date of Patent: Feb. 18, 2020

(54) SYSTEM AND METHOD FOR SUPPORTING USER-LEVEL DIRECT MEMORY ACCESS INPUT/OUTPUT IN DISTRIBUTED FILE SYSTEM ENVIRONMENT

(71) Applicant: ELECTRONICS AND TELECOMMUNICATIONS RESEARCH INSTITUTE, Daejeon (KR)

(72) Inventors: Ki-Sung Jin, Daejeon (KR); Young-Kyun Kim, Daejeon (KR); Hong-Yeon Kim, Daejeon (KR); Sang-Min Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 187 days.

(21) Appl. No.: 15/895,752

(22) Filed: Feb. 13, 2018

(65) Prior Publication Data
US 2018/0307638 A1 Oct. 25, 2018

(30) Foreign Application Priority Data
Apr. 19, 2017 (KR) .......................... 10-2017-0050401

(51) Int. Cl.
*G06F 15/167* (2006.01)
*G06F 13/28* (2006.01)
(Continued)

(52) U.S. Cl.
CPC ............ *G06F 13/28* (2013.01); *G06F 3/0643* (2013.01); *G06F 3/0659* (2013.01); *G06F 9/544* (2013.01);
(Continued)

(58) Field of Classification Search
CPC .... G06F 16/182; G06F 16/10; G06F 16/1727; G06F 16/185; G06F 16/188
See application file for complete search history.

(56) References Cited

U.S. PATENT DOCUMENTS 5,623,666 A * 4/1997 Pike ...................... G06F 3/0601
5,838,937 A 11/1998 Lee et al.
(Continued)

FOREIGN PATENT DOCUMENTS

| KR | 10-1544717 B1 | 8/2015 |
| KR | 10-2015-0101244 A | 9/2015 |
| KR | 10-1644678 B1 | 8/2016 |

*Primary Examiner* — Brian Whipple
*Assistant Examiner* — Gregory P Tolchinsky

(57) ABSTRACT

Disclosed herein are a method and system for supporting user-level DMA I/O in a distributed file system environment. The system includes a DMA I/O library located in a user space and configured to process data-processing requests of an application using a control channel or a data channel, a distributed file system client process located in the user space and configured to process data while communicating with a remote distributed storage cluster, a VFS located in a kernel space, and a FUSE kernel module located in the kernel space, wherein the control channel is a path along which the DMA I/O library and the distributed file system client process are connected to each other through the VFS and the FUSE kernel module, and wherein the data channel is a path along which the DMA I/O library and the distributed file system client process are directly connected to each other.

13 Claims, 9 Drawing Sheets

(51) Int. Cl.
*G06F 3/06* (2006.01)
*G06F 9/54* (2006.01)
*H04L 29/08* (2006.01)
*G06F 16/188* (2019.01)
*G06F 16/182* (2019.01)

(52) U.S. Cl.
CPC ............ *G06F 9/545* (2013.01); *G06F 16/188* (2019.01); *G06F 16/1824* (2019.01); *H04L 67/1097* (2013.01)

(56) References Cited

U.S. PATENT DOCUMENTS

| | | | |
|---|---|---|---|
| 7,743,111 B2 * | 6/2010 | Soltis | G06F 16/182 |
| | | | 709/217 |
| 9,549,026 B2 | 1/2017 | Lacapra | |
| 9,805,055 B2 | 10/2017 | Lee et al. | |
| 10,095,701 B1 * | 10/2018 | Faibish | G06F 16/13 |
| 2002/0065810 A1 * | 5/2002 | Bradley | G06F 16/1794 |
| 2002/0069324 A1 * | 6/2002 | Gerasimov | G06F 16/10 |
| | | | 711/114 |
| 2004/0078568 A1 * | 4/2004 | Pham | G06F 21/6218 |
| | | | 713/165 |
| 2012/0054877 A1 * | 3/2012 | Rosu | G06F 9/545 |
| | | | 726/30 |
| 2012/0210068 A1 * | 8/2012 | Joshi | G06F 9/45558 |
| | | | 711/122 |
| 2014/0258222 A1 | 9/2014 | Guo et al. | |
| 2016/0150546 A1 | 5/2016 | Kwon et al. | |
| 2016/0321291 A1 * | 11/2016 | Malhotra | G06F 16/1727 |
| 2017/0192979 A1 * | 7/2017 | Yang | G06F 16/182 |

* cited by examiner

SYSTEM AND METHOD FOR SUPPORTING USER-LEVEL DIRECT MEMORY ACCESS INPUT/OUTPUT IN DISTRIBUTED FILE SYSTEM ENVIRONMENT

CROSS REFERENCE TO RELATED APPLICATION

This application claims the benefit of Korean Patent Application No. 10-2017-0050401, filed Apr. 19, 2017, which is hereby incorporated by reference in its entirety into this application.

BACKGROUND OF THE INVENTION

1. Technical Field

The present invention relates generally to a system and method for allowing applications to directly access a file system client using user-level Direct Memory Access (DMA) Input/Output (I/O) in order to improve file input/output performance in a distributed file system environment operated by a plurality of storage servers.

2. Description of the Related Art

Due to the acceleration of digital innovation with the development of information and communication technology, large amounts of data are generated in real time in modern society. In particular, an increase in the amount of production, distribution, and storage of information depending on the advent of various information channels represented by social services and smart devices has resulted in an explosive increase in data. Further, there is a growing tendency for the explosive increase in data to exceed the limit of existing data management and analysis systems. This is evidenced by the fact that new data amounting to several Petabytes (PB) or more is monthly being generated in representative domestic and foreign Internet enterprises. These enterprises generally use distributed file system technology, which connects a plurality of storage servers to each other over a network to provide large virtual storage space. With the advent of such distributed file system technology, enterprises not only can secure large data storage space, but also can easily respond to rapid changes in an information technology (IT) environment by utilizing capacity and performance scalability provided by a distributed file system even in an unpredictable environment in which the amount of data may explosively increase.

Meanwhile, from the standpoint of an interface that allows an application service to access files stored in a distributed file system, several selective technologies can be used. The easiest method is a method by which a server on which an application service is running mounts and uses a volume using an industrial standard protocol such as a Common Internet File System (CIFS) or Network File System (NFS). Such protocols are suitable for an enterprise environment in which the scale of data is not large and a user type is limited, but has many constraints in performance and scalability in an environment such as a cloud in which the number of users and the amount of data are rapidly increased in real time. In order to solve this problem, in principal distributed file systems such as Ceph or GlusterFS, an independent protocol that allows an application service to access a file system is developed to permit a volume to be mounted. A representative example of this scheme is a client configuration method using a Filesystem in Userspace (FUSE).

FUSE is open software that helps a system developer develop a file system without editing the internal code of a kernel. In conventional file systems, interfaces for internal Virtual File System (VFS) of a kernel must be directly implemented in the kernel. However, in a FUSE-based development environment, the implementation of the interfaces may be realized in user space other than kernel space, and thus advantages may be obtained in various aspects, such as development convenience, a shortened development period, and debugging. However, in spite of these advantages, the greatest problem confronting the FUSE-based file system is that input/output performance of the file system may be deteriorated. The reason for this is that a data processing path for an application service is complicated, and thus excessive costs, such as frequently occurring memory-copying cost and context-switching cost, are incurred.

FIG. 1 is a diagram illustrating a conventional FUSE-based distributed file system environment 1a. Referring to FIG. 1, when an application (or an application program) 110a running on a system 100a corresponding to a client node accesses data stored in a distributed storage cluster 200, the application 110a requests access to data from space 120a, in which a file system volume is mounted, using a read( ) or write( ) standard Application Programming Interface (API). Thereafter, the user API is converted into a system call for a kernel, and then the system call is transferred to a Virtual File System (VFS) 130a. In this case, the memory area of the user space is copied to the memory area of the kernel. Further, the VFS 130a transfers data to a FUSE kernel module 140a without performing memory copying, wherein the memory area pointer of the kernel is transferred thereto. Thereafter, the FUSE kernel module 140a transmits data to a local pipe so as to transfer the data to a distributed file system client process 160a. A FUSE user library layer 150a receives the data from the local pipe, and at this time, memory copying occurs. Further, the distributed file system client process 160a processes the data while communicating with the remote distributed storage cluster 200.

The item to which attention is to be paid in the above procedure is the difference between the processing schemes of the local file system, such as a conventional third extended filesystem (ext3) or extended file system (xfs), and the FUSE-based distributed file system. In the local file system such as conventional ext3 or xfs, in order for the application 110a to access data, only the layer of the VFS 130a of the kernel and the layer of the file system 120a are required. However, the FUSE-based file system requires a reverse call from the kernel space to the user space to support a user-level file system, and thus the separate library (FUSE user library) 150a in the user space and the file system processing layer (i.e. distributed file system client process) 160a running in the user space are additionally required.

That is, in the FUSE-based file system illustrated in FIG. 1, the deterioration of I/O performance attributable to the complexity of respective layers, which process data and memory copying therebetween, may inevitably occur.

The above-described background technology is technological information that was possessed by the present applicant to devise the present invention or that was acquired by the present applicant during the procedure for devising the present invention, and thus such information cannot be construed to be known technology that was open to the public before the filing of the present invention.

PRIOR ART DOCUMENTS

Patent Documents (Patent Document 1) Korean Patent No. 10-1544717

SUMMARY OF THE INVENTION

Accordingly, the present invention has been made keeping in mind the above problems occurring in the prior art, and an object of the present invention is to provide a method and system for supporting user-level DMA I/O in a distributed file system environment, which can improve data I/O performance in a distributed file system environment based on a Filesystem in Userspace (FUSE).

In accordance with an aspect of the present invention to accomplish the above object, there is provided a system for supporting user-level Direct Memory Access (DMA) Input/Output (I/O) in a distributed file system environment, including a DMA I/O library located in a user space and configured to process data-processing requests of an application using a control channel or a data channel; and a distributed file system client process located in the user space and configured to process data while communicating with a remote distributed storage cluster, wherein the control channel is a path along which the DMA I/O library and the distributed file system client process are connected to each other through a Virtual File System (VFS) and a Filesystem in Userspace (FUSE) kernel module that are located in a kernel space, and wherein the data channel is a path along which the DMA I/O library and the distributed file system client process are directly connected to each other.

The DMA I/O library forwards a metadata-processing request, among the data-processing requests, through the control channel, and forwards a non-metadata-processing request, among the data-processing requests, through the data channel.

The DMA I/O library may utilize an LD_PRELOAD mechanism using a mapping table in which standard data-processing functions are mapped to DMA I/O functions.

The data channel may allow the DMA I/O library and the distributed file system client process to exchange data with each other through a local pipe.

The DMA I/O library may include an input/output path controller for controlling an input/output path by determining whether a position of a file to be accessed by the application belongs to a local file system or to a distributed file system.

The input/output path controller may include a DMA mount table that contains information about a mounted distributed file system, and is configured to separate the local file system and the mounted distributed file system using the DMA mount table, for a file open request.

The input/output path controller may include a DMA file table that contains descriptors corresponding to opened files of the mounted distributed file system, and may be configured to separate a file of the local file system and a file of the mounted distributed file system using the DMA file table, for a file input/output request.

The distributed file system client process may include a file handle management unit for assigning a descriptor of each opened file and managing the opened file while the file is open; a data management unit for performing a data-processing request for the opened file; and a remote I/O management unit for communicating with the mounted distributed file system.

In accordance with another aspect of the present invention to accomplish the above object, there is provided a method for supporting user-level Direct Memory Access (DMA) Input/Output (I/O) in a distributed file system environment, including making, by an application in a user space, data-processing requests; separating, by a DMA I/O library in the user space, the data-processing requests into a metadata-processing request and a non-metadata-processing request; forwarding the metadata-processing request to a distributed file system client process, located in the user space, through a control channel; forwarding the non-metadata-processing request to the distributed file system client process through a data channel; and receiving a response to the corresponding data-processing request from the distributed file system client process, wherein the control channel is a path along which the DMA I/O library and the distributed file system client process are connected to each other through a Virtual File System (VFS) and a Filesystem in Userspace (FUSE) kernel module that are located in a kernel space, and wherein the data channel is a path along which the DMA I/O library and the distributed file system client process are directly connected to each other.

The DMA I/O library may utilize an LD_PRELOAD mechanism using a mapping table in which standard data-processing functions are mapped to DMA I/O functions.

The data channel may allow the DMA I/O library and the distributed file system client process to exchange data with each other through a local pipe.

Separating the data-processing requests into the metadata-processing request and the non-metadata-processing request may include determining whether a position of a file to be accessed by the application belongs to a local file system or to a distributed file system; and controlling an input/output path depending on a position of data to be accessed by the application.

Determining whether the position of the file belongs to the local file system or to the distributed file system may be configured to separate the local file system and a mounted distributed file system using a path stored in a DMA mount table, for a file open request, and the DMA mount table may contain information about the mounted distributed file system.

Determining whether the position of the file belongs to the local file system or to the distributed file system may be configured to separate a file of the local file system and a file of the mounted distributed file system using a file descriptor stored in a DMA file table, for a file input/output request, and the DMA file table may contain descriptors corresponding to opened files of the mounted distributed file system.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
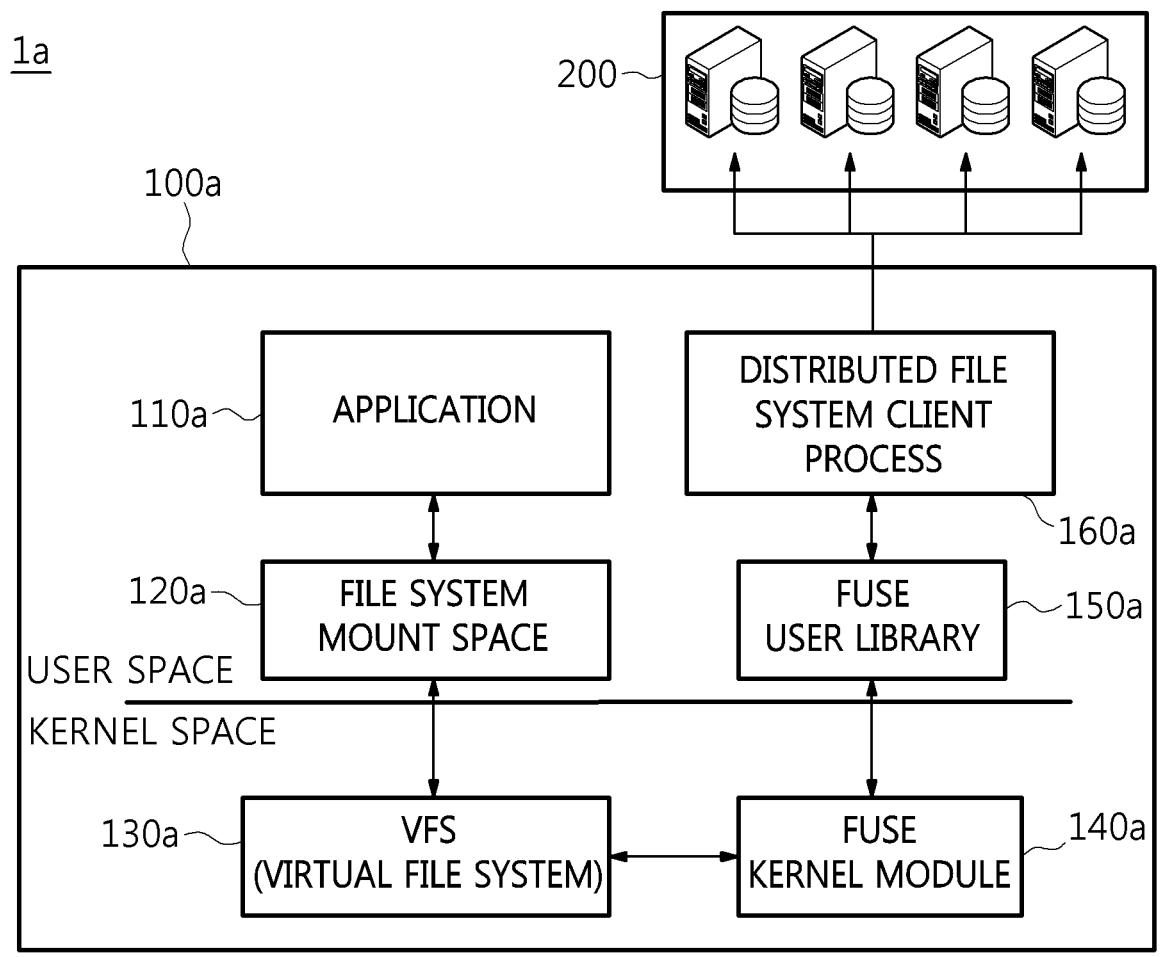
FIG. 1 is a diagram illustrating a conventional FUSE-based distributed file system environment.

The present invention may be variously changed and may have various embodiments, and specific embodiments will be described in detail below with reference to the attached drawings. The advantages and features of the present invention and methods for achieving them will be more clearly understood from the following detailed description taken in conjunction with the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

However, the present invention is not limited to the following embodiments, and some or all of the following embodiments can be selectively combined and configured so that various modifications are possible. In the following embodiments, terms such as "first" and "second" are not intended to restrict the meanings of components, and are merely intended to distinguish one component from other components. A singular expression includes a plural expression unless a description to the contrary is specifically pointed out in context. In the present specification, it should be understood that the terms such as "include" or "have" are merely intended to indicate that features or components described in the present specification are present, and are not intended to exclude the possibility that one or more other features or components will be present or added.

Embodiments of the present invention will be described in detail with reference to the accompanying drawings. In the following description of the present invention, the same reference numerals are used to designate the same or similar elements throughout the drawings, and repeated descriptions of the same components will be omitted.

Figure 2:
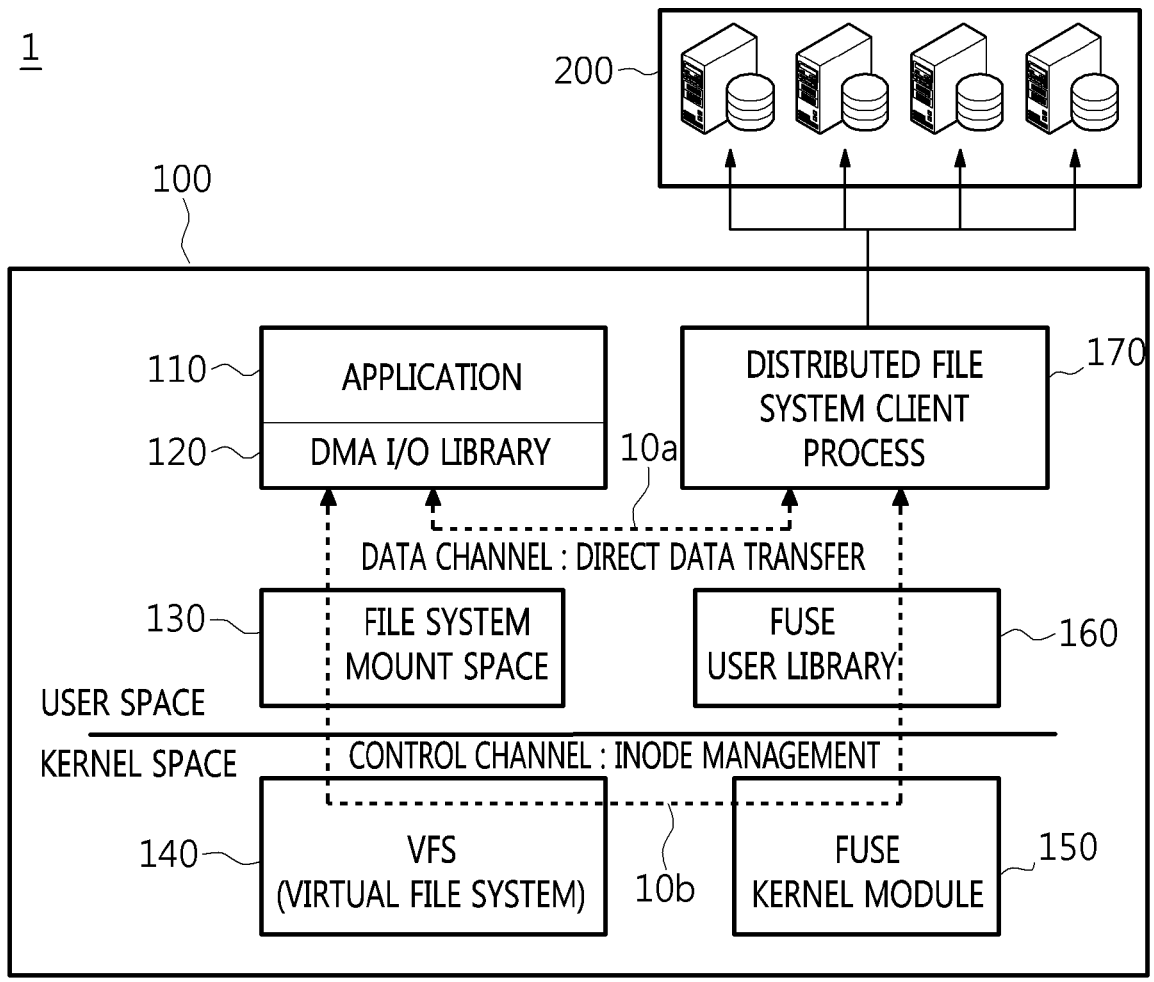
FIG. 2 is a diagram illustrating a FUSE-based distributed file system environment according to an embodiment of the present invention.

FIG. 2 is a diagram illustrating a FUSE-based distributed file system environment 1 according to an embodiment of the present invention.

Referring to FIG. 2, in the FUSE-based distributed file system environment 1 according to the embodiment of the present invention, a system 100 for supporting user-level DMA I/O in a distributed file system environment is mutually connected to a distributed storage cluster 200.

The system 100 for supporting user-level DMA I/O in a distributed file system environment according to the embodiment of the present invention is a physical system having a function of making an input/output (I/O) request to the distributed storage cluster 200, and corresponds to a client node in the FUSE-based distributed file system environment 1. Further, the system 100 may include a processor (not shown), memory (not shown), etc.

The distributed storage cluster 200 is a set of storage spaces that provides distributed file systems. The volume of each distributed file system is mounted on the system 100 for supporting user-level DMA I/O in a distributed file system environment according to the embodiment of the present invention so as to access the distributed storage 200.

In detail, the system 100 for supporting user-level DMA I/O in a distributed file system environment according to the embodiment of the present invention runs an operating system (OS) including user space and kernel space. Here, the user space includes an application (or an application program) 110, a DMA I/O library 120, file system mount space 130, a FUSE user library 160, a distributed file system client process 170, etc., and the kernel space includes a Virtual File System (VFS) 140, a Filesystem in Userspace (FUSE) kernel module 150, etc.

The application 110 may make a data-processing request including the input/output of data, and the distributed file system client process 170 may process the data-processing request made by the application 110.

The DMA I/O library 120 forwards the data-processing request of the application 110 using a control channel 10b or a data channel 10a.

Here, the control channel 10b is a path identical to the path along which a data-processing request or a response to the data-processing request is forwarded in the conventional FUSE-based distributed file system environment 1a, and is a path connected to the distributed file system client process 170 through the VFS 140 and the FUSE kernel module 150 of the kernel space. Further, the data channel 10a is a path that is directly connected to the distributed file system client process 170 without passing through the kernel space.

Here, the DMA I/O library 120 forwards a metadata-processing request, among data-processing requests, to the distributed file system client process 170 through the control channel 10b, so that the metadata-processing request is processed therein, and directly forwards a non-metadata-processing request, among the data-processing requests, to the distributed file system client process 170 through the data channel 10a, so that the non-metadata-processing request is processed therein.

That is, when a single file is processed, metadata such as an inode may be processed while passing through the FUSE kernel layer, and non-metadata may be processed while the application 110 is directly communicating with the distributed file system client process 170, rather than passing through the kernel. A data exchange scheme through the data channel 10a is referred to as "user-level DMA I/O".

Accordingly, six layers essentially required in the procedure for processing the non-metadata-processing request of the application 110 may be simplified to two layers, unnecessary memory-copying cost may be reduced, and context-switching cost for a process between the kernel space and the user space may be reduced, thus enabling the efficiency of the system to be improved.

Furthermore, the DMA I/O library 120 may utilize an LD_PRELOAD mechanism based on a mapping table in which standard data-processing functions are mapped to DMA I/O functions in order for the application 110 to directly communicate with the distributed file system client process 170.

Here, "LD_PRELOAD mechanism" is a method in which, if a function having the same name as a system function is present in a library declared as LD_PRELOAD when a user calls the system function, the function declared in the library is primarily executed. For example, it is assumed that a new library for replacing a write( ) function, which is a standard system function, is developed and is declared as "LD_PRELOAD". In this way, even if the application calls write( ) which is a standard system function, so as to write non-metadata to a specific file, a write ( ) function included in the declared library, instead of the system function that is already present, is executed.

The following Table 1 shows an example of a mapping table in which standard data-processing functions of a file system are mapped to functions for processing the standard data-processing functions based on DMA I/O.

TABLE 1

DMA API using LD_PRELOAD

| POSIX API | DMA API | Functions |
| --- | --- | --- |
| open(*arguments*) | DMA_open(*arguments*) | Open file |
| close(*arguments*) | DMA_close(*arguments*) | Close file |
| write(*arguments*) | DMA_write(*arguments*) | Write data to file |
| read(*arguments*) | DMA_read(*arguments*) | Read data from file |
| pwrite(*arguments*) | DMA_pwrite(*arguments*) | Write data to position-based file |
| pread(*arguments*) | DMA_pread(*arguments*) | Read data from position-based file |

According to the DMA I/O processing technique proposed in the present invention, inode-processing functions are processed in an existing kernel layer in principle, and thus the mapping table is defined limitedly only for non-metadata-processing functions that allow the application 110 and the distributed file system client process 170 to exchange non-metadata with each other. Also, since, due to the features of LD_PRELOAD, all substitute functions must have the same function arguments as original system functions, the arguments of all functions applied to the present invention inherit the arguments of the system functions without change.

For example, (i) a DMA_open( ) function may be used when a file is newly opened. When the application calls an open( ) function to use a file, a DMA_open( ) function is executed instead of the open( ) function depending on the mapping table. Here, the DMA_open( ) function may search for the corresponding file while directly communicating with the client process 170 of the distributed file system, rather than the kernel, and a created file descriptor may be returned if the corresponding file is found. (ii) A DMA_close( ) function may be used when the used file is terminated. (iii) When data is written, a DMA_write( ) or a DMA_pwrite( ) function may be used. The DMA_write( ) function is a function of writing data having a specific size at the position of a file indicated by a current file descriptor, and the DMA_pwrite( ) function may designate the position of the file to which the data is to be written, together with the data. When the application 110 calls a write( ) or pwrite( ) function so as to write data, the DMA_write( ) or DMA_pwrite( ) function is executed in place of the write( ) or pwrite( ) function depending on the mapping table. Here, the data to be written is directly forwarded to the distributed file system client process 170 without passing through the kernel layer. (iv) When the application calls a read( ) or pread( ) system function to read data, the DMA_read( ) or DMA_pread( ) function is executed in place of the read( ) or pread( ) system function. Here, the data may be directly transferred from the distributed file system client process 170.

Accordingly, the non-metadata-processing functions requested by the application 110 are replaced with functions in the DMA I/O library 120, instead of existing system functions. In this case, the non-metadata may be directly transferred to the distributed file system client process 170 without passing through the kernel.

In a selective embodiment, the data channel 10a allows the DMA I/O library 120 and the distributed file system client process 170 to exchange data with each other through a local pipe.

In particular, the DMA I/O library 120 may determine whether the position of data requested by the application belongs to a local file system or to a distributed file system, using a DMA mount table that contains information of mounted distributed file systems, and may separate data of a local file system and data of a mounted distributed file system using a DMA file table that contains descriptors of opened files of each mounted distributed file system.

Accordingly, the application may access not only the data of the distributed file system, but also the data of the local file system if necessary.

The file system mount space 130 may receive a data-processing request from the DMA I/O library 120 and forward the data-processing request to the VFS 140 of the kernel space. Here, the received data-processing request is forwarded in such a way that a user API is converted into a system call for the kernel and the system call is transferred to the VFS 140 and that the memory area of the user space is copied to the memory area of the kernel space.

The VFS 140 provides interfaces with the application 110 and one or more file systems in the kernel space. From the standpoint of the application 110, the VFS 140 appears to be a file system with which the application 110 interacts.

Here, the VFS 140 may receive a data-processing request from the file system mount space 130, and may forward data-processing request to the FUSE kernel module 150. Here, while the VFS 140 interacts with the FUSE kernel module 150, memory copying does not occur, and the memory area pointer of the kernel is transferred therebetween.

The FUSE kernel module 150 allows the VFS 140 to interact with the file system (not shown) of the user space or the distributed file system 200. From the standpoint of the VFS 140, the FUSE kernel module 150 appears to be a file system with which the VFS 140 interacts.

Here, the FUSE kernel module 150 may transmit the data-processing request to the FUSE user library 160 through a local pipe.

The FUSE user library 160 may receive the data-processing request through the local pipe, and may forward data-processing request to the distributed file system client process 170 for processing the request. At this time, memory copying may occur.

The distributed file system client process 170 processes the received data-processing request while interacting with the distributed storage cluster 200. Here, the distributed file system client process 170 may be created based on the FUSE user library 160.

Figure 3:
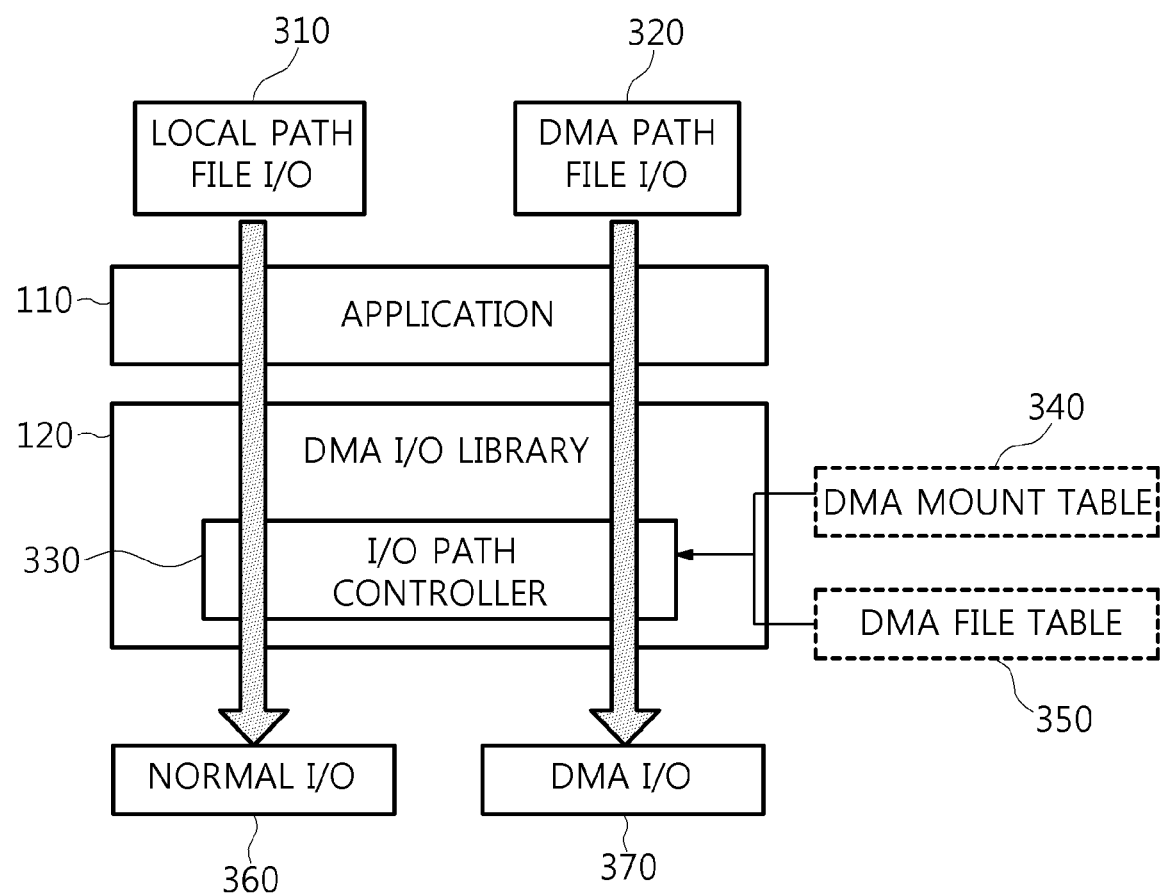
FIG. 3 is a diagram illustrating a method for separately processing a local file system and a DMA I/O-based distributed file system in a system for supporting user-level DMA I/O in a distributed file system environment according to an embodiment of the present invention.

FIG. 3 is a diagram illustrating a method for separately processing a local file system and a DMA I/O-based distributed file system in the system 100 for supporting user-level DMA I/O in a distributed file system environment according to an embodiment of the present invention.

The application 110 of the system (see 100 of FIG. 2) for supporting user-level DMA I/O in a distributed file system environment according to the embodiment of the present invention may access data of a distributed file system to execute a service, but may also access files of a local file system, such as files of a home directory, if necessary. Therefore, whether to apply DMA I/O may be determined depending on the position of data to be accessed by the application 110.

Referring to FIG. 3, the DMA I/O library 120 of the system (see 100 of FIG. 2) for supporting user-level DMA I/O in a distributed file system environment according to the embodiment of the present invention may include an input/output (I/O) path controller 330.

The input/output path controller 330 may determine whether the position of a file required by the application 110 belongs to a local file system or a distributed file system. Further, for this operation, the input/output path controller 330 may use a DMA mount table 340 and a DMA file table 350. Here, the input/output path controller 330 may manage the DMA mount table 340 and the DMA file table 350.

In particular, the DMA mount table 340 and the DMA file table 350 may be stored and managed in the DMA I/O library 120, or may be stored and managed in the input/output path controller 330.

The DMA mount table 340 stores the path along which the volume of each distributed file system is mounted. That is, when the application 110 requests an open( ) function (310 or 320), the input/output path controller 330 may determine whether an absolute path included in the function is present in the DMA mount table 340. That is, if it is determined that the absolute path is present in the DMA mount table 340, DMA I/O 370 for the distributed file system is applied to the processing of the request because the distributed file system for supporting DMA I/O is mounted. In contrast, if it is determined that the absolute path is not present in the DMA mount table 340, normal I/O 360 for the local file system is applied to the processing of the request.

The DMA file table 350 stores the descriptors of files of each distributed file system opened by a DMA_open( ) function. That is, when the application 110 requests a read( ) or write( ) function (310 or 320), the input/output path controller 330 may determine whether a file descriptor of the corresponding function is present in the DMA file table 350. That is, if it is determined that the file descriptor of the requested function is present in the DMA file table 350, the DMA I/O 370 for the distributed file system is applied to the processing of the request because a target file is the file of the distributed file system for supporting DMA I/O. If it is determined that the file descriptor of the requested function is not present in the DMA file table 350, the normal I/O 360 for the local file system is applied to the processing of the request.

Figure 4:
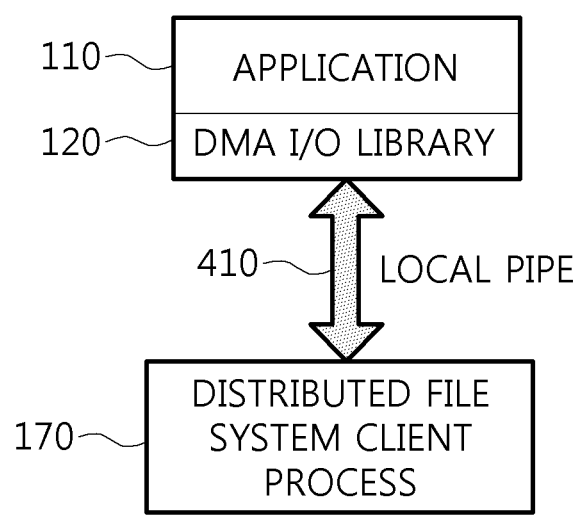
FIG. 4 is a block diagram illustrating an example of the data channel illustrated in FIG. 2.

FIG. 4 is a block diagram illustrating an example of the data channel illustrated in FIG. 2.

Referring to FIG. 4, the system 100 for supporting user-level DMA I/O in a distributed file system environment according to the embodiment of the present invention uses a data channel (see 10a of FIG. 2) for user-level DMA I/O. The data channel (see 10a of FIG. 2) may directly forward the data-processing request of an application 110 from a DMA I/O library 120 to a distributed file system client process 170, and may directly forward a response to the data-processing request from the distributed file system client process 170 to the DMA I/O library 120 in a reverse direction.

Here, the DMA I/O library 120 and the distributed file system client process 170 may exchange data with each other through a local pipe 410. That is, since all user-level DMA I/O operations are performed in a client node, the DMA I/O library 120 and the distributed file system client process 170 may be defined so as to be present in the same system 100. Therefore, as a method for allowing separated individual processes to communicate with each other, the local pipe 410 may be used.

Figure 5:
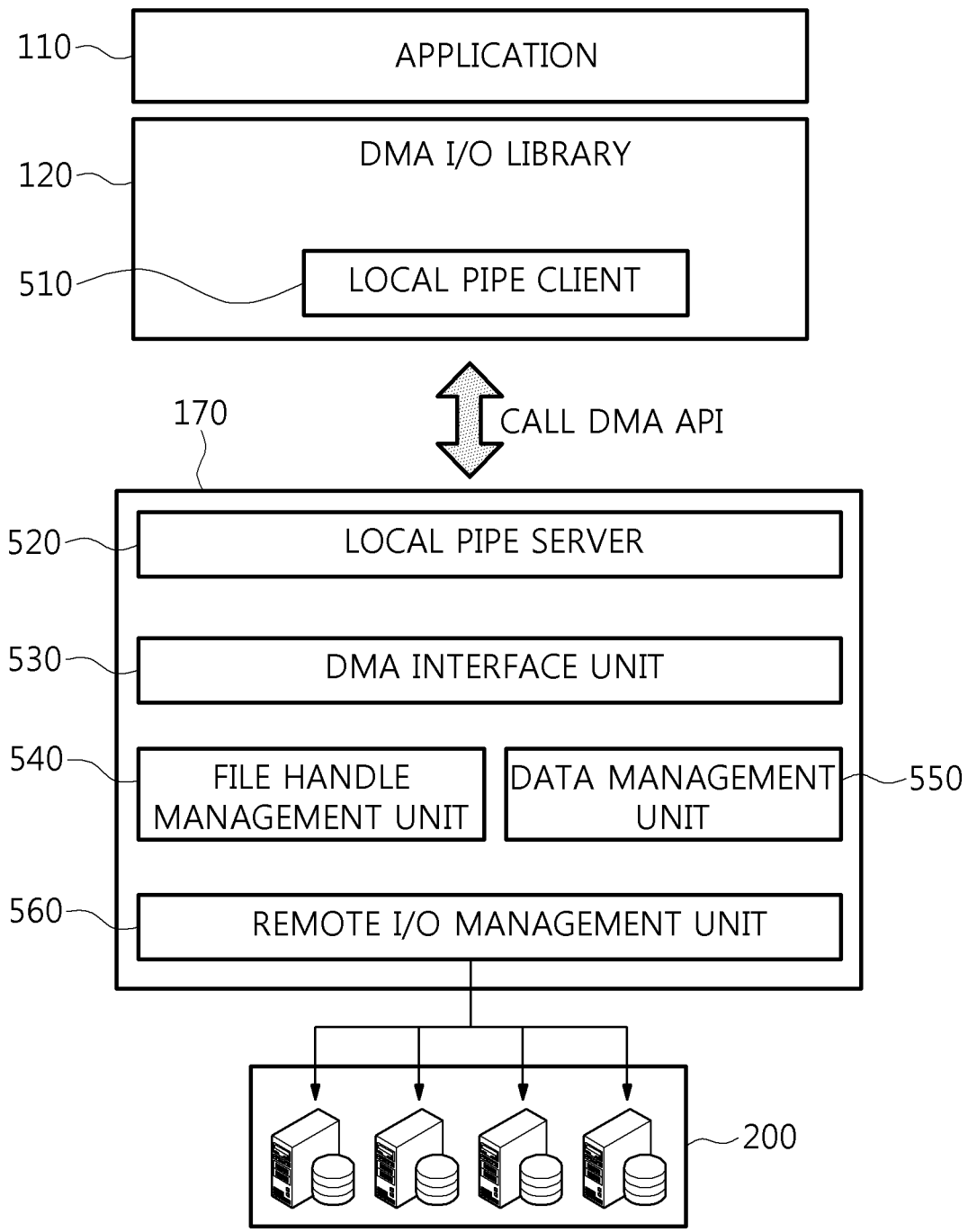
FIG. 5 is a block diagram illustrating an example of the distributed file system client process illustrated in FIG. 2.

FIG. 5 is a block diagram illustrating an example of the distributed file system client process 170 illustrated in FIG. 2.

Referring to FIG. 5, the layer of an application 110 is a unit for supporting DMA I/O operation, and may be composed of a DMA I/O library 120 and a local pipe client 510. The local pipe client 510 is used to exchange data with the distributed file system client process 170.

Meanwhile, the DMA I/O library 120 and the local pipe client 510 may be operated in compliance with an LD_PRELOAD command provided by a Linux system when the application system 110 runs, without being autonomously operated.

The distributed file system client process 170 according to the embodiment of the present invention may include a local pipe server 520, a DMA interface unit 530, a file handle management unit 540, a data management unit 550, a remote I/O management unit 560, etc.

The local pipe server 520 for receiving the data-processing request of the application 110 is located in a forward portion of the distributed file system client process 170. The local pipe server 520 may receive the data-processing request of the application 110, and may forward the data-processing request to the DMA interface unit 530 for processing DMA I/O operations.

The file handle management unit 540 functions to manage opened files through DMA I/O. That is, when the application 110 opens a file, the file handle management unit 540 may assign a file descriptor corresponding to the file, and may manage the file until the application 110 closes the file.

The data management unit 550 is a unit for, when the application 110 makes a request for data access through a read( ) or write( ) function, processing the request. That is, when the application 110 desires to read data from a specific area in a file or write data to the specific area, the data management unit 550 may perform the processing of the corresponding data on behalf of the distributed storage cluster 200, which is remotely located.

The remote I/O management unit 560 is a communication unit for communicating with the remote distributed storage cluster 200 over a network.

Figure 6:
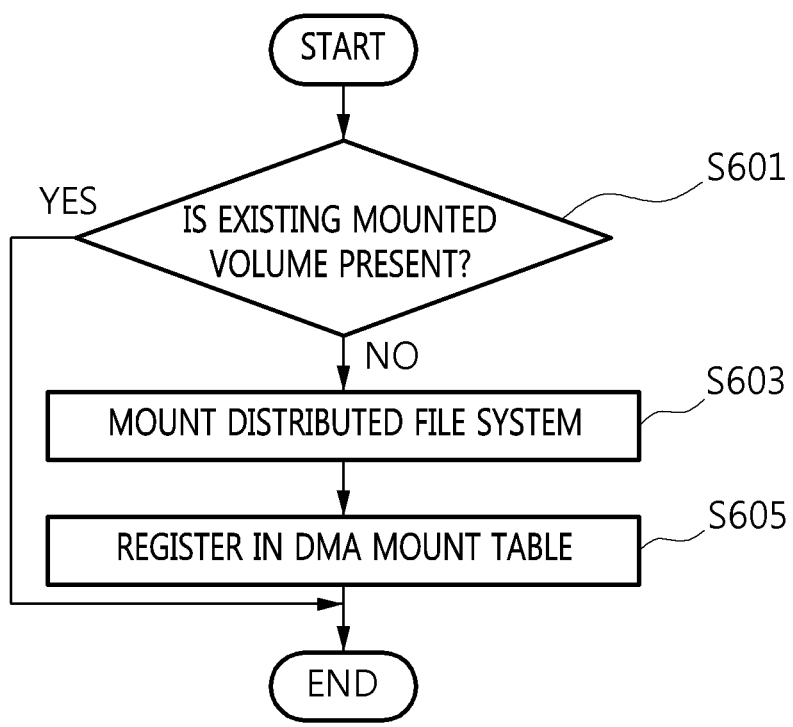
FIG. 6 is an operation flowchart illustrating a procedure for mounting the volume of a distributed file system in the system for supporting user-level DMA I/O in a distributed file system environment according to an embodiment of the present invention.

FIG. 6 is an operation flowchart illustrating a procedure for mounting the volume of a distributed file system in the system 100 for supporting user-level DMA I/O in a distributed file system environment according to an embodiment of the present invention.

In the embodiment of the present invention, when the application desires to use a distributed file system for supporting DMA I/O, the step of mounting and installing the volume of the distributed file system on a client server must be performed in advance.

Referring to FIG. 6, the system manager (not shown) of the system 100 for supporting user-level DMA I/O in a distributed file system environment according to an embodiment of the present invention checks whether an existing volume is mounted, so as to mount the volume of the distributed file system at step S601.

As a result of the checking at step S601, if an existing volume is found to be already mounted, a mount procedure is terminated to prevent duplicate volume mounting.

As a result of the checking at step S601, if an existing volume is not found to be already mounted and it is desired to mount a new volume, the new volume (distributed file system) is mounted in the space of a client node based on the storage mount rule of the distributed file system at step S603. Further, at step S605, the corresponding mount information is registered in a DMA mount table (see 340 of FIG. 3) so that a mounted distributed file system can support user-level DMA I/O, and then the mount procedure is terminated.

Figure 7:
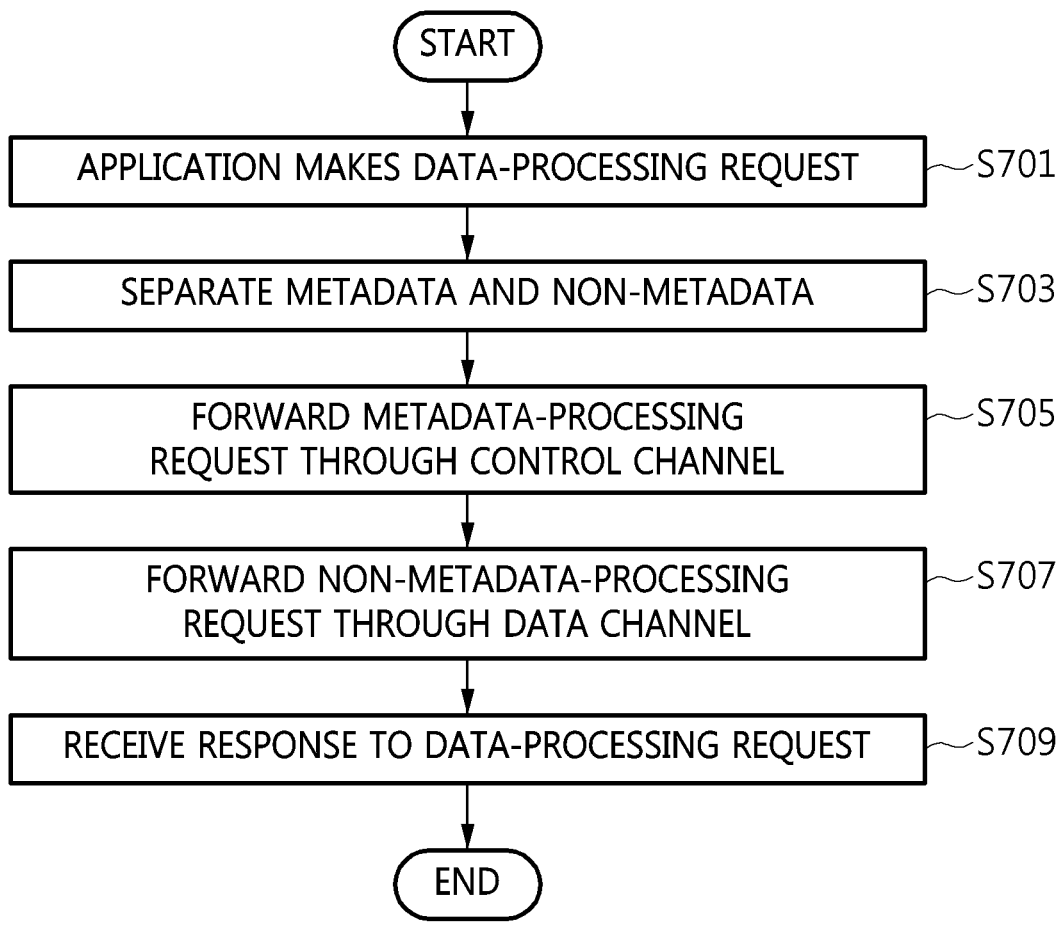
FIG. 7 is an operation flowchart illustrating a method for supporting user-level DMA I/O in a distributed file system environment according to an embodiment of the present invention.

FIG. 7 is an operation flowchart illustrating a method for supporting user-level DMA I/O in a distributed file system environment according to an embodiment of the present invention.

Referring to FIG. 7, in the method for supporting user-level DMA I/O in a distributed file system environment according to the embodiment of the present invention, the system (see 100 of FIG. 2) for supporting user-level DMA I/O in a distributed file system environment allows an application in user space to make data-processing requests at step S701.

The system targeted in the present invention corresponds to a client node in a FUSE-based distributed file system environment, and a distributed storage cluster (see 200 of FIG. 2) is present outside the targeted system. Here, the distributed storage cluster 200 is the set of storage spaces for providing distributed file systems.

Further, in the method for supporting user-level DMA I/O in a distributed file system environment according to the embodiment of the present invention, the system (see 100 of FIG. 2) for supporting user-level DMA I/O in a distributed file system environment separates allows a DMA I/O library to separate the data-processing requests into a metadata-processing request and a non-metadata-processing request at step S703.

The reason for this is that, when a single file is processed, it is intended to process metadata, such as an inode, while passing through a FUSE kernel layer, and to process non-metadata while the application is directly communicating with a distributed file system client process without passing through the kernel layer.

Here, the DMA I/O library (see 120 of FIG. 2) may utilize an LD_PRELOAD mechanism based on a mapping table in which standard data-processing functions are mapped to DMA I/O functions, in order for the application (see 110 of FIG. 2) to directly communicate with the distributed file system client process (see 170 of FIG. 2). Here, "LD_PRE-LOAD mechanism" is a method in which, if a function having the same name as a system function is present in a library declared as LD_PRELOAD when a user calls the system function, the function declared in the library is primarily executed.

In particular, inode-processing functions are processed in an existing kernel layer in principle, and thus the mapping table is defined limitedly only for non-metadata-processing functions. Examples of the non-metadata-processing functions may include DMA_open( ) DMA_close( ) DMA_write( ) DMA_pwrite( ) DMA read( ) and DMA_pread( ) functions.

Further, the method for supporting user-level DMA I/O in a distributed file system environment according to the embodiment of the present invention may determine whether the position of a file that is the target of the corresponding data-processing request of the application belongs to a local file system or a distributed file system, and may perform control corresponding to the results of the determination.

Next, in the method for supporting user-level DMA I/O in a distributed file system environment according to the embodiment of the present invention, the system (see 100 of FIG. 2) for supporting user-level DMA I/O in a distributed file system environment forwards the metadata-processing request to the distributed file system client process located in the user space through a control channel (see 10b of FIG. 2) at step S705.

In conventional technology, all data-processing requests were processed through the kernel space without distinguishing between a metadata-processing request and a non-metadata-processing request. However, the method for supporting user-level DMA I/O in a distributed file system environment according to the embodiment of the present invention forwards only the metadata-processing request through the control channel (see 10b of FIG. 2) and the kernel space.

Here, the control channel (see 10b of FIG. 2) is a path identical to the path along which a data-processing request or a response to the data-processing request is forwarded in the conventional FUSE-based distributed file system environment, and is a path connected to the distributed file system client process (see 170 of FIG. 2) through the VFS (see 140 of FIG. 2) and the FUSE kernel module (see 150 of FIG. 2) of the kernel space.

Next, in the method for supporting user-level DMA I/O in a distributed file system environment according to the embodiment of the present invention, the system (see 100 of FIG. 2) for supporting user-level DMA I/O in a distributed file system environment directly forwards the non-metadata-processing request to the distributed file system client process located in the user space through the data channel (see 10a of FIG. 2) at step S707.

Here, the data channel (see 10a of FIG. 2) is a path that is directly connected to the distributed file system client process (see 170 of FIG. 2), without passing through the kernel space. That is, compared to the control channel (see 10b of FIG. 2), simplicity and efficiency may be improved.

In this case, the data channel (see 10a of FIG. 2) allows the DMA I/O library (see 120 of FIG. 2) and the distributed file system client process (see 170 of FIG. 2) to communicate with each other through a local pipe.

Next, in the method for supporting user-level DMA I/O in a distributed file system environment according to the embodiment of the present invention, the system (see 100 of FIG. 2) for supporting user-level DMA I/O in a distributed file system environment receives a response to the data-processing request of the application at step S709.

In a selective embodiment, among steps S701, S703, S705, S707 and S709, the step S705 of forwarding the metadata-processing request through the control channel and the step S707 of forwarding the non-metadata-processing request through the data channel may be performed in parallel.

In a selective embodiment, among steps S701, S703, S705, S707, and S709, the step S707 of forwarding the non-metadata-processing request through the data channel may be performed first, and the step S705 of forwarding the metadata-processing request through the control channel may be subsequently performed.

Accordingly, the procedure for processing a non-metadata-processing request, among the data-processing requests of the application, may be simplified, unnecessary memory-copying cost may be reduced, and context-switching cost for a process between the kernel space and the user space may also be reduced, thus enabling the efficiency of the system to be improved.

Figure 8:
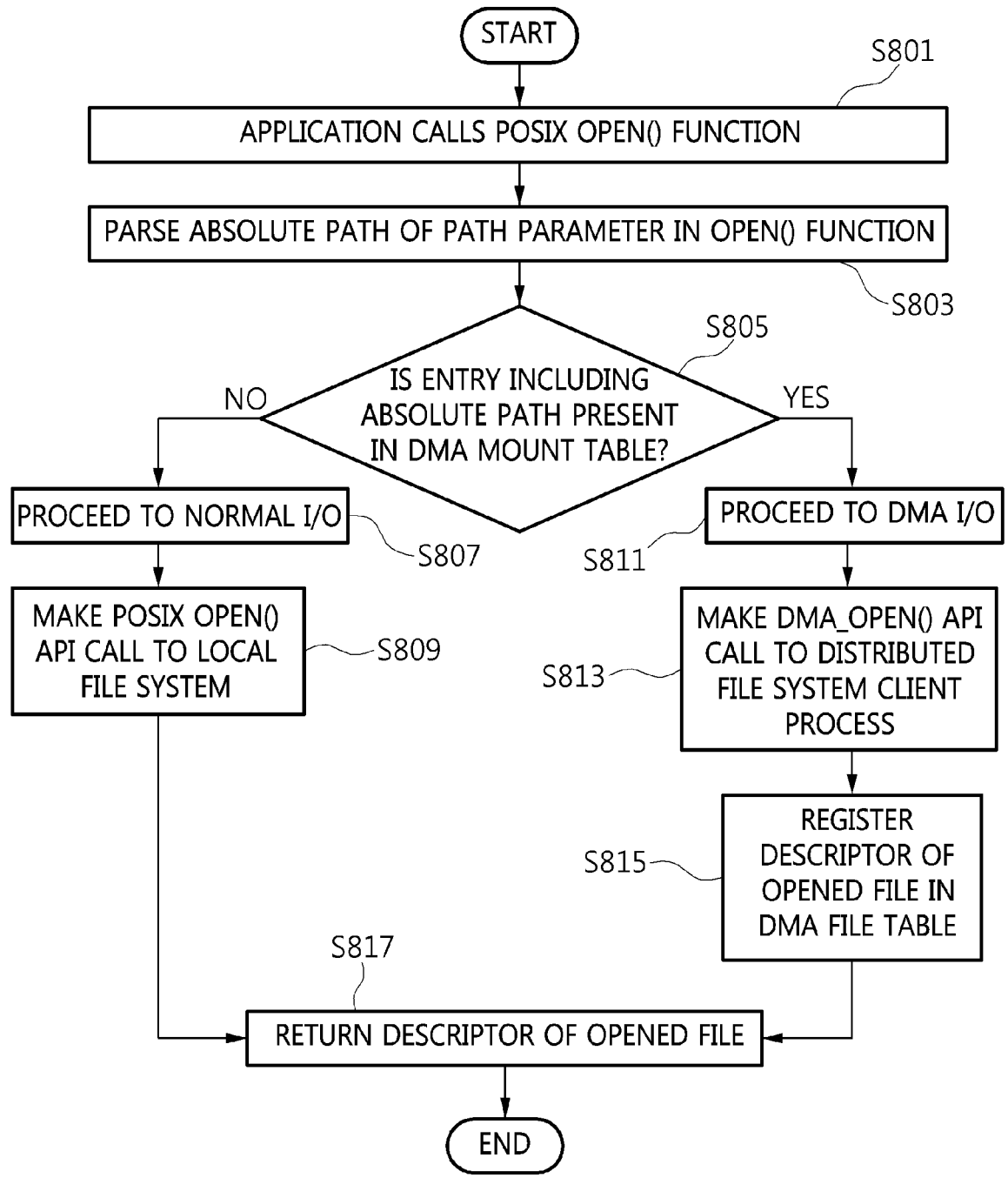
FIG. 8 is an operation flowchart illustrating an example of a method for processing a file open request using DMA I/O in the method for supporting user-level DMA I/O in a distributed file system environment according to an embodiment of the present invention.

FIG. 8 is an operation flowchart illustrating an example of a method for processing a file open request using DMA I/O in the method for supporting user-level DMA I/O in a distributed file system environment according to an embodiment of the present invention.

Referring to FIG. 8, in the method for supporting user-level DMA I/O in a distributed file system environment according to the embodiment of the present invention, an application makes a file open request by calling a Portable Operating System Interface (POSIX) open( ) function at step S801.

Next, the method for supporting user-level DMA I/O in a distributed file system environment according to the embodiment of the present invention parses the absolute path of a path parameter in the open( ) function at step S803.

Further, the method for supporting user-level DMA I/O in a distributed file system environment according to the embodiment of the present invention may check whether the parsed absolute path is included in a DMA mount table, based on a comparison, and then determines whether a file that is the target to be opened is a file belonging to a mounted distributed file system or a file belonging to a local file system at step S805.

If it is determined at step S805 that the absolute path of the file that is the target of the open( ) function does not match paths belonging to the DMA mount table, the method performs control such that the application accesses the file of the local file system using the same method (based on normal I/O) as a conventional method, instead of using the method based on DMA I/O at step S807.

Next, the method for supporting user-level DMA I/O in a distributed file system environment according to the embodiment of the present invention makes a POSIX open ( ) API call to the local file system so as to access the file of the local file system after step S807 has been performed, at step S809. That is, the procedure in which the application accesses the local file system is identical to a conventional file system usage procedure, except for the procedure for checking a DMA mount table.

If it is determined at step S805 that the absolute path of the file that is the target to be opened matches the path of a distributed file system registered in the DMA mount table, the method performs control such that the application accesses the file of the distributed file system through user-level DMA I/O at step S811.

Next, the method for supporting user-level DMA I/O in a distributed file system environment according to the embodiment of the present invention replaces an open( ) API with a DMA_open( ) API so as to access the file of the distributed file system after step S811 has been performed, and then directly forwards the DMA_open( ) API to the distributed file system client process without passing through the kernel at step S813. Thereafter, the descriptor of the file opened by the DMA_open( ) API is registered in the DMA file table at step S815.

Thereafter, the method for supporting user-level DMA I/O in a distributed file system environment according to the embodiment of the present invention returns the descriptor of the opened file if the file open request of the application has been processed at step S817.

Accordingly, the method for supporting user-level DMA I/O in a distributed file system environment according to the embodiment of the present invention may process an open request even for a file stored in the local file system, as well as for a file stored in the distributed file system.

Figure 9:
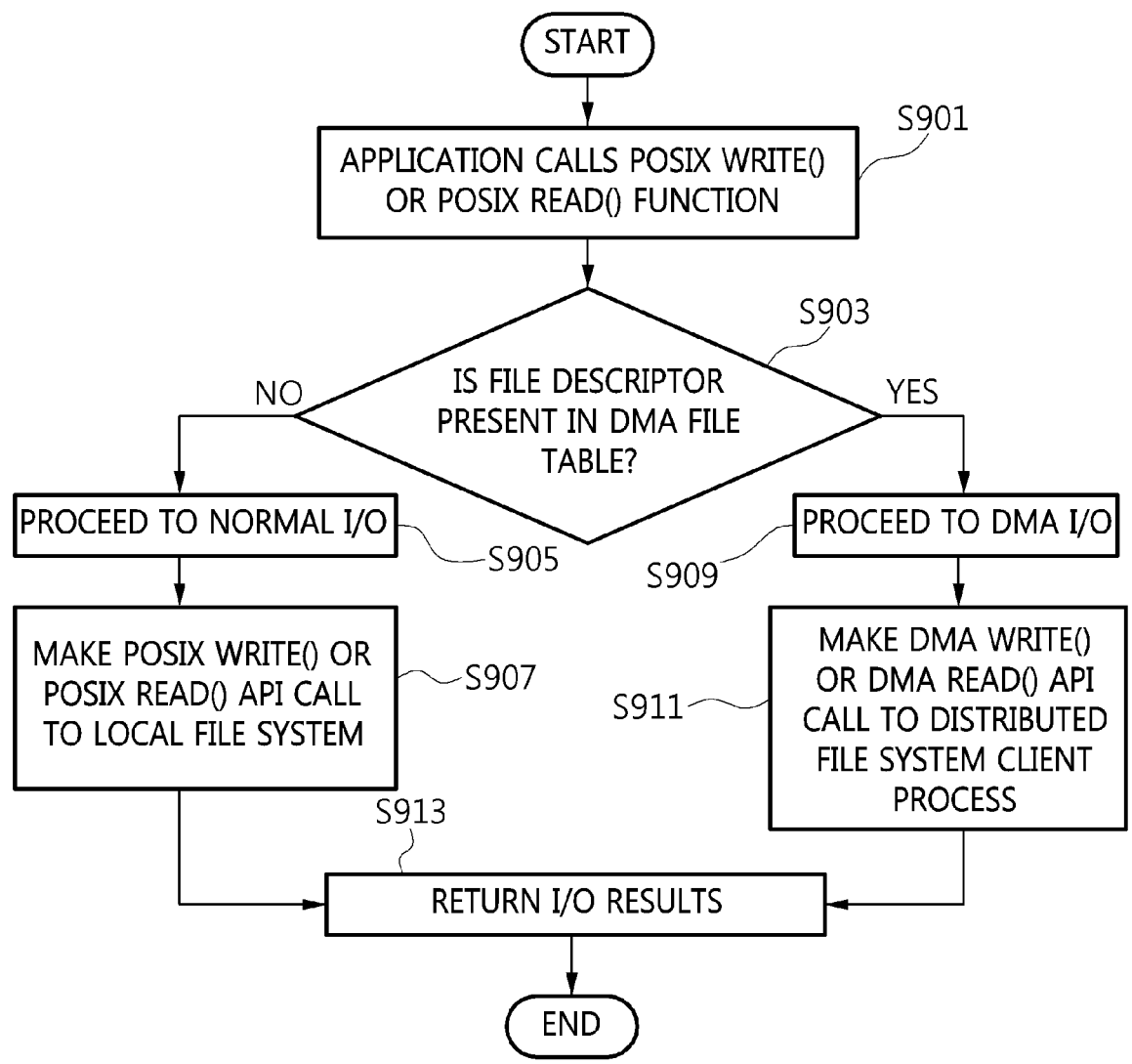
FIG. 9 is an operation flowchart illustrating an example of a method for processing a data input/output request using DMA I/O in the method for supporting user-level DMA I/O in a distributed file system environment according to an embodiment of the present invention.

FIG. 9 is an operation flowchart illustrating an example of a method for processing a data input/output request using DMA I/O in the method for supporting user-level DMA I/O in a distributed file system environment according to an embodiment of the present invention.

Referring to FIG. 9, in the method for supporting user-level DMA I/O in a distributed file system environment according to the embodiment of the present invention, when an application desires to access data in a specific file, a POSIX read( ) function or a POSIX write( ) function, which is a standard POSIX system function, is called using the descriptor of a previously opened file at step S901.

Next, the method for supporting user-level DMA I/O in a distributed file system environment according to the embodiment of the present invention checks whether the file descriptor argument of the POSIX read( ) or POSIX write ( ) function is included in a DMA file table, based on a comparison, and then determines whether the corresponding request is a data input/output request for a file belonging to a mounted distributed file system at step S903.

If it is determined at step S903 that the descriptor of the file to be accessed is not included in the DMA file table, access to a file belonging to a local file system is made, and thus the method performs control such that the application accesses the file of the local file system through an existing POSIX read( ) or POSIX write( ) function at step S905.

Next, the method for supporting user-level DMA I/O in a distributed file system environment according to the embodiment of the present invention makes a POSIX write ( ) or POSIX read( ) API call to the local file system after step S905 has been performed, at step S907.

If it is determined at step S903 that the descriptor of the file to be accessed is included in the DMA file table, access to a file belonging to the distributed file system is made, and thus the method performs control such that the application accesses the file of the distributed file system through user-level DMA I/O at step S909.

Next, the method for supporting user-level DMA I/O in a distributed file system environment according to an embodiment of the present invention replaces a write( ) API or a read( ) API with a DMA_write( ) API or a DMA read( ) API so as to access the file of the distributed file system after step S909 has been performed, and directly forwards the DMA_write( ) API or the DMA read( ) API to the distributed file system client process without passing through the kernel at step S911.

Furthermore, the method for supporting user-level DMA I/O in a distributed file system environment according to an embodiment of the present invention returns the results of processing if the data input/output request of the application has been processed at step S913.

Accordingly, the method for supporting user-level DMA I/O in a distributed file system environment according to the embodiment of the present invention may process an input/ output request for a file stored in the local file system, as well as for a file stored in the distributed file system.

The above-described embodiments may be implemented as a program that can be executed by various computer means. In this case, the program may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as Compact Disk Read-Only Memory (CD-ROM) and a Digital Versatile Disk (DVD), magneto-optical media, such as a floptical disk, ROM, Random Access Memory (RAM), and flash memory. Examples of the program instructions include machine language code, such as code created by a compiler, and high-level language code executable by a computer using an interpreter. The hardware devices may be configured to operate as one or more software modules in order to perform the operation of the present invention, and vice versa.

Specific executions, described in the present invention, are only embodiments, and are not intended to limit the scope of the present invention using any methods. For the simplification of the present specification, a description of conventional electronic components, control systems, software, and other functional aspects of the systems may be omitted. Further, connections of lines between components shown in the drawings or connecting elements therefor illustratively show functional connections and/or physical or circuit connections. In actual devices, the connections may be represented by replaceable or additional various functional connections, physical connections or circuit connections. Further, unless a definite expression, such as "essential" or "importantly" is specifically used in context, the corresponding component may not be an essential component for the application of the present invention.

In accordance with the present invention, by means of the method and system for supporting user-level DMA I/O in a distributed file system environment, data requested by an application is directly transferred to a distributed file system client process without passing through a kernel, thus not only reducing unnecessary memory-copying cost and guaranteeing a short response time and high input/output performance, but also simplifying the data-processing procedure of conventional FUSE-based file systems and improving system efficiency.

Therefore, the spirit of the present invention should not be defined by the above-described embodiments, and it will be apparent that the accompanying claims and equivalents thereof are included in the scope of the spirit of the present invention.

What is claimed is:

1. A system for supporting user-level Direct Memory Access (DMA) Input/Output (I/O) in a distributed file system environment, comprising:
 a processor;
 a DMA I/O library located in a user space and configured to process data-processing requests of an application using a control channel or a data channel; and
 a distributed file system client process located in the user space and configured to process data while communicating with a remote distributed storage cluster,
 wherein the DMA I/O library separates the data-processing requests into a metadata-processing request and a non-metadata-processing request,
 wherein the metadata-processing request is forwarded to the distributed file system client process through the control channel,
 wherein the non-metadata-processing request is forwarded to the distributed file system client process through the data channel,
 wherein a response to the corresponding data-processing request is received from the distributed file system client process,
 wherein the control channel is a path along which the DMA I/O library and the distributed file system client process are connected to each other through a Virtual File System (VFS) and a Filesystem in Userspace (FUSE) kernel module that are located in a kernel space, and
 wherein the data channel is a path along which the DMA I/O library and the distributed file system client process are directly connected to each other.

2. The system of claim 1, wherein the DMA I/O library utilizes an LD_PRELOAD mechanism using a mapping table in which standard data-processing functions are mapped to DMA I/O functions.

3. The system of claim 2, wherein the data channel allows the DMA I/O library and the distributed file system client process to exchange data with each other through a local pipe.

4. The system of claim 3, wherein the DMA I/O library comprises an input/output path controller for controlling an input/output path by determining whether a position of a file to be accessed by the application belongs to a local file system or to a distributed file system.

5. The system of claim 4, wherein the input/output path controller comprises a DMA mount table that contains information about a mounted distributed file system, and is configured to separate the local file system and the mounted distributed file system using the DMA mount table, for a file open request.

6. The system of claim 5, wherein the input/output path controller further comprises a DMA file table that contains descriptors corresponding to opened files of the mounted distributed file system, and is configured to separate a file of the local file system and a file of the mounted distributed file system using the DMA file table, for a file input/output request.

7. The system of claim 6, wherein the distributed file system client process comprises:
 a file handle management unit for assigning a descriptor of each opened file and managing the opened file while the file is open;
 a data management unit for performing a data-processing request for the opened file; and
 a remote I/O management unit for communicating with the mounted distributed file system.

8. A method for supporting user-level Direct Memory Access (DMA) Input/Output (I/O) in a distributed file system environment, comprising:
 making, by an application in a user space, data-processing requests;
 separating, by a DMA I/O library in the user space, the data-processing requests into a metadata-processing request and a non-metadata-processing request;

forwarding the metadata-processing request to a distributed file system client process, located in the user space, through a control channel;

forwarding the non-metadata-processing request to the distributed file system client process through a data channel; and receiving a response to the corresponding data-processing request from the distributed file system client process, wherein the control channel is a path along which the DMA I/O library and the distributed file system client process are connected to each other through a Virtual File System (VFS) and a Filesystem in Userspace (FUSE) kernel module that are located in a kernel space, and wherein the data channel is a path along which the DMA I/O library and the distributed file system client process are directly connected to each other.

9. The method of claim 8, wherein the DMA I/O library utilizes an LD_PRELOAD mechanism using a mapping table in which standard data-processing functions are mapped to DMA I/O functions.

10. The method of claim 9, wherein the data channel allows the DMA I/O library and the distributed file system client process to exchange data with each other through a local pipe.

11. The method of claim 10, wherein separating the data-processing requests into the metadata-processing request and the non-metadata-processing request comprises:

determining whether a position of a file to be accessed by the application belongs to a local file system or to a distributed file system; and controlling an input/output path depending on a position of data to be accessed by the application.

12. The method of claim 11, wherein:

determining whether the position of the file belongs to the local file system or to the distributed file system is configured to separate the local file system and a mounted distributed file system using a path stored in a DMA mount table, for a file open request, and the DMA mount table contains information about the mounted distributed file system.

13. The method of claim 12, wherein:

determining whether the position of the file belongs to the local file system or to the distributed file system is configured to separate a file of the local file system and a file of the mounted distributed file system using a file descriptor stored in a DMA file table, for a file input/output request, and the DMA file table contains descriptors corresponding to opened files of the mounted distributed file system.

* * * * *